United States Patent [19]

Geiser, Jr. et al.

[11] Patent Number: 5,029,968
[45] Date of Patent: Jul. 9, 1991

[54] OPTOELECTRONIC HYBRID PACKAGE ASSEMBLY INCLUDING INTEGRAL, SELF-ALIGNED FIBER OPTIC CONNECTOR

[75] Inventors: Raymond W. Geiser, Jr., Orange; Alvin L. Krum, Hungtington Beach; James T. Hartley, Tustin, all of Calif.

[73] Assignee: Hughes Aircraft Company, Los Angeles, Calif.

[21] Appl. No.: 489,395

[22] Filed: Mar. 5, 1990

[51] Int. Cl.$^5$ .............................................. G02B 6/36
[52] U.S. Cl. .................................. 350/96.20; 357/80; 350/96.15
[58] Field of Search ............... 350/96.15, 96.17, 96.20; 250/227, 552; 357/17, 19, 30, 74, 80

[56] References Cited

U.S. PATENT DOCUMENTS

| | | | |
|---|---|---|---|
| 4,119,363 | 10/1978 | Camlibel et al. | 350/96.20 |
| 4,752,109 | 6/1988 | Gordon et al. | 357/80 X |
| 4,756,592 | 7/1988 | Sasayama et al. | 350/96.20 |
| 4,803,689 | 2/1989 | Shibanuma | 350/96.20 X |
| 4,834,492 | 5/1989 | Ishii et al. | 350/96.20 |
| 4,865,410 | 12/1989 | Estrada et al. | 350/96.20 |

Primary Examiner—William L. Sikes
Assistant Examiner—Phan T. Heartney
Attorney, Agent, or Firm—Terje Gudmestad; W. K. Denson-Low

[57] ABSTRACT

A package housing (52) for hermetically enclosing an optoelectronic component (56) is formed with a tubular extension (54) which extends outwardly from a wall (52a) of the housing (52) and communicates with the interior of the housing (52) through an opening (52h) formed through the wall (52a). The axis of the extension (54) is self-aligned with a light propagating (transmitting or receiving) portion (56a) of the component (56) as mounted in the housing (52). A piece of optical fiber (60) has an end portion (60c, 60d) which is fittingly retained in the extension (54), and extends substantially from an outer end (54a) of the extension (54) to the light propagating portion (56a) of the component (56). A metal jacket (60b) is stripped from a portion (60c) of the optical fiber (60) which fits in a small diameter outer portion (54b) of the extension (54), whereas a portion (60d) of the optical fiber (60) covered with the jacket (60b) fits in a larger diameter inner portion (54c) of the extension (54). A cap (64) is fixed to the outer end (54a) of the extension (54), and has a central hole (64a) through which the optical fiber (60) extends, to constitute an integral connector (62). The optical fiber (60) is automatically self-aligned with the light propagating portion (56a) of the component (56) by insertion of the end portion (60c, 60d) of the optical fiber (60) into the extension (54).

16 Claims, 2 Drawing Sheets

OPTOELECTRONIC HYBRID PACKAGE ASSEMBLY INCLUDING INTEGRAL, SELF-ALIGNED FIBER OPTIC CONNECTOR

BACKGROUND OF THE INVENTION

1. Field of the Invention

The present invention generally relates to the field of optoelectronic communications, and more specifically to an optoelectronic hybrid package assembly including an integral fiber optic connector.

2. Description of the Related Art

Optoelectronic communication systems utilizing optical fibers as transmission lines include various transmitting and receiving modules. These modules conventionally include a hybrid microcircuit component having a light emitting diode (LED) or laser diode (for a transmitter); or a photodiode or other photodetector (for a receiver); integrated with signal processing circuitry on an integrated circuit chip or die. The component is mounted in a package housing or enclosure which is hermetically sealed for protection of the microcircuit. The module must further necessarily include a means for optically connecting the internally mounted microcircuit component to an optical fiber network external of the package.

A first prior art method of making such an external connection is illustrated in FIG. 1. An optoelectronic assembly 10 includes a rectangular housing or enclosure 12 in which an optoelectronic hybrid microcircuit component 14 is hermetically mounted. The component 14 includes a light propagating portion 14a, which may be a transmitter (LED or laser diode), or a receiver (photodetector). The light propagating portion 14a generally has a relatively small effective area, typically on the order of 50 microns wide.

The component 14 is optically connected to an external communication network by means of an optical fiber 16 in a "flying lead" configuration. The optical fiber 16 includes a transparent, light transmitting core 16a formed of glass plastic, or other suitable material. The core 16a typically has a central portion with a relatively high index of refraction, and a cladding layer with a lower index of refraction coaxially formed over the central portion. A buffer or jacket 16b made of a polymer or electrically conductive metal is coaxially formed over the cladding.

An end of the optical fiber 16 is inserted into the housing 12 through an opening 12a formed through a side wall 12b thereof. Further illustrated is a strain relief sleeve 18 which extends outwardly from the wall 12b to prevent flexure of the optical fiber 16 inside the housing 12, and increase the bend radius of the fiber 16 where it exits the housing 12.

Further illustrated in FIG. 1 is a connector 20 attached to the end of the optical fiber 16 external of the housing 12. The assembly 10 is often manufactured and shipped to an end user without a connector 20 attached, due to the numerous types of optical communication networks existing in the field which utilize many variant types of connectors, and the impracticality of stocking a particular assembly 10 with many different types of connectors. The optical fiber 16 which extends from the housing 12 as a flying lead is on the order of 125 microns in diameter, extremely fragile, and can be easily broken during shipping, installation, or maintenance, requiring time consuming and expensive reworking. In addition, attachment of the optical fiber 16 to the connector 20 is a high risk operation which is both time consuming and low in yield, resulting in a costly package configuration.

As illustrated in FIG. 1, a support member or block 22 is disposed in the housing 12 for retention and alignment of the optical fiber 16 therein. During fabrication of the assembly 10, the end of the optical fiber 16 is inserted into the housing 12 through the opening 12a as shown. However, due to the very small effective area of the light propagating portion 14a of the component 14, the end of the optical fiber 16 must be precisely aligned to the portion 14a. This is done by connecting the external end of the fiber 16 to an optical transmitter or receiver (depending on the type of light propagating portion 14a), connecting the component 14 to an electronic test instrument (not shown), moving the internal end of the fiber 16 until maximum optical coupling is detected by the test instrument, and then fixing the optical fiber 16 to the support block 22 by a chemical adhesive such as epoxy, soldering, or other applicable method as indicated at 24. This alignment process is time consuming, resulting in low yield and high expense, and subjects the optical fiber 16 to processing steps in which it is exposed to high risk of breakage.

The flying lead configuration of FIG. 1 is also highly inefficient in the utilization of space. Another prior art arrangement which eliminates the flying lead and is more space efficient than the assembly 10 is shown in FIG. 2. An optoelectronic assembly 30 includes a housing 32 in which is mounted a component 34 having a light propagating portion 34a. A transparent window 32a made of quartz glass or the like is fitted in an opening formed through a wall 32b of the housing 32. The component 34 is mounted such that the light propagating portion 34a is disposed as close as possible to the window 32a.

The configuration of FIG. 2 does not include an optical fiber, and thereby eliminates the problems associated therewith. However, only one mounting position for the component 34 in the housing 32 is possible, which further permits the mounting flexibility of another component 36 such as a Peltier cooler. Although the internal alignment problem regarding the light propagating portion 34a has been eliminated, the problem of aligning the light propagating portion 34a to an external optical fiber (not shown) for optical interconnection with other network elements remains. Typically, a bayonet or threaded connector 32c is used for this purpose. However, mechanical alignment of the optical axis of the connector 32c to the light propagating portion 34a of the component 34 requires precise and expensive process steps.

SUMMARY OF THE INVENTION

The present invention provides an optoelectronic hybrid package assembly including a housing for hermetically enclosing an optoelectronic microcircuit component, an optical fiber for external optical connection of the component, and an optical connector for the optical fiber which is integral with the package assembly. The optical fiber is located entirely inside the assembly, and immune to breakage, while enabling a high degree of flexibility in selection of the mounting location of the component in the housing, as well as the type and size of fiber to be used.

In addition to eliminating the fragile flying lead conventionally utilized in the prior art arrangement described above with reference to FIG. 1 of the drawings, the present invention enables the internal optical fiber to be automatically self-aligned to the light propagating portion of the component, thereby eliminating the time consuming and costly alignment step required in the prior art. The present assembly has a smaller footprint on a printed circuit board on which it is mounted, and may be manufactured at substantially lower cost with increased yield on a commercial production basis by eliminating the high risk associated with handling of the prior art flying leads.

In accordance with the present invention, a package housing for hermetically enclosing an optoelectronic component is formed with a tubular extension which is brazed to the package wall, extends outwardly from the wall of the housing, and communicates with the interior of the housing through an opening formed through the wall. The axis of the extension is self-aligned with a light propagating (transmitting or receiving) portion of the component as mounted in the housing. A piece of optical fiber has an end portion which is fittingly retained in the extension, and extends substantially from an outer end of the extension to the light propagating portion of the component. The metal jacket is stripped from a portion of the hermetic optical fiber which fits in a small diameter outer portion of the extension, whereas a portion of the optical fiber covered with the jacket fits in a larger diameter inner portion of the extension. A cap is fixed to the outer end of the extension, and has a central hole through which the optical fiber extends, to constitute an integral connector. The optical fiber is automatically self-aligned with the light propagating portion of the component by insertion of the end portion of the optical fiber into the extension.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
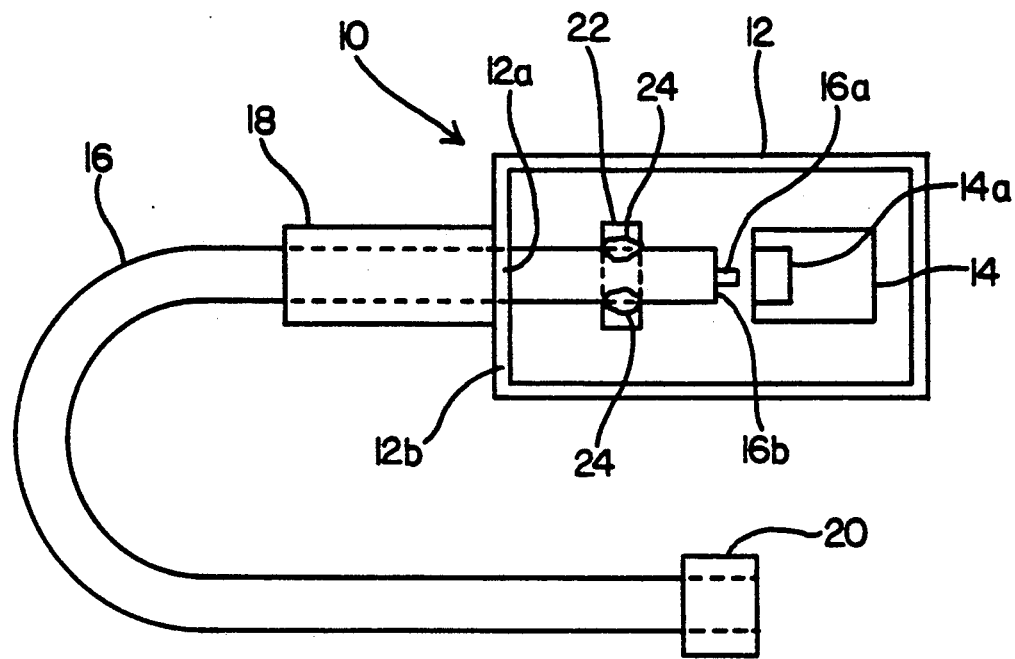
FIG. 1 is a plan view of a prior art optoelectronic package assembly.
Figure 2:
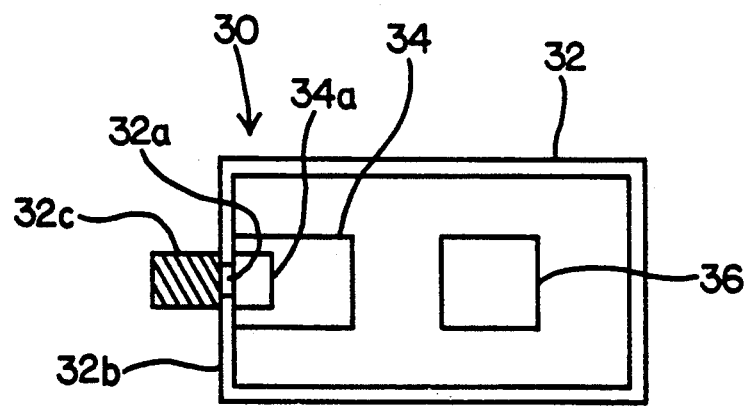
FIG. 2 is a plan view of another prior art optoelectronic package assembly.
Figure 3:
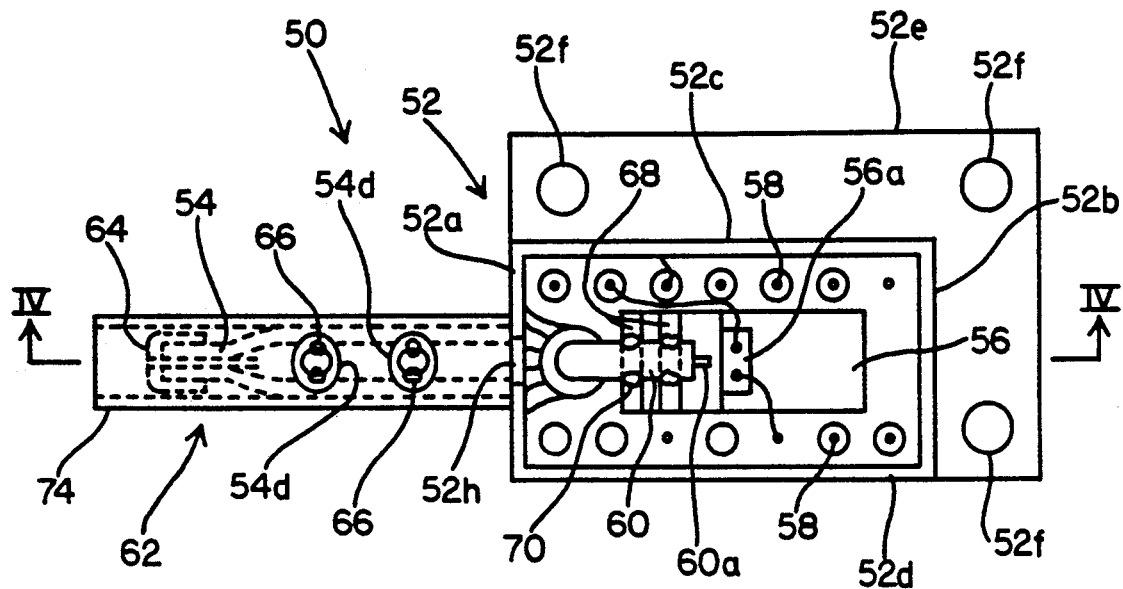
FIG. 3 is a plan view of an optoelectronic package assembly embodying the present invention.
Figure 4:
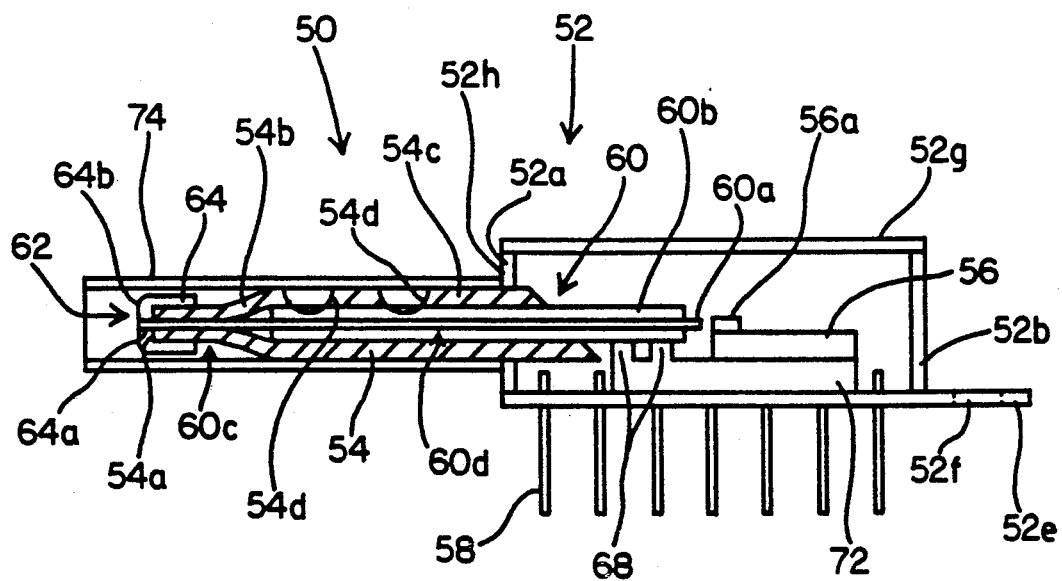
FIG. 4 is a sectional elevation taken on a line IV—IV of FIG. 3.

Referring now to FIGS. 3 and 4 of the drawing, an optoelectronic package assembly embodying the present invention is generally designated as 50, and includes a housing or enclosure 52 having side walls 52a, 52b, 52c, and 52d. The enclosure 52 further includes a base 52e, which may extend beyond the walls and be formed with mounting holes 52f as illustrated, and a top 52g.

A hole or opening 52h is formed through the wall 52a. A rigid tubular extension 54 is fixed to and extends away from the wall 52 coaxially with the opening 52h. An optoelectronic component 56, which may be a hybrid microcircuit, is fixedly mounted in the enclosure 52 such that a light propagating portion 56a of the component 56 is aligned with the axis of the extension 54 through the opening 52h. The light propagating portion 56a may be a transmitter such as an LED or laser diode; or a receiver such as a photodiode or phototransistor.

The assembly 50 is illustrated as having a "plug-in" configuration, with pins 58 extending through the base 52e of the enclosure 52 for insertion of the assembly 50 into a female electrical connector (not shown). An axial leaded package is also possible. Electrical terminals on the component 56 are suitably connected to appropriate pins 58, although not illustrated in detail. The enclosure 52 is hermetically sealed to provide a sterile operating environment for the component 56.

The assembly 50 further includes a length of optical fiber 60 which is fittingly retained in the extension 54, and extends substantially between an outer end 54a of the extension 54 and the light propagating portion 56a of the component 56. The outer end 54a forms a male optical connector 62 for interconnection with a coaxial female connector (not shown) of an external optical fiber communication network which is not the subject matter of the present invention. However, it is within the scope of the invention to adapt the outer end 54a to constitute a female connector for mating with an external male connector if required in a particular application.

The connector 62 may further include a bushing or cap 64 which is fixed to the end 54a of the extension 54 and formed with a central hole 64a through an end 64b thereof through which the optical fiber 60 extends. In this case, the outer end of the fiber 60 extends slightly external of the end 54a of the extension 54 through the end 64b of the cap 64, and has an end face which is coplanar with the outer surface of the end 64b of the cap 64.

The optical fiber 60 has a light transmitting core 60a made of glass or other material which has the required properties as described above with reference to the optical fiber 16, and a buffer or jacket 60b formed over the core 60a. The jacket 60b typically has an outer diameter of 125 to 140 microns, and provides protection and support for the core 60a which typically has a diameter of 50 to 100 microns, but which may be as small as 5 to 9 microns in certain applications.

In accordance with an important feature of the present invention, since the axis of the extension 54 is aligned with the light propagating portion 56a of the component 56, insertion of the optical fiber 60 into the extension 54 through the opening 52h results in automatic self-alignment of the optical fiber 60 with the light propagating portion 56a, eliminating the time consuming and costly alignment procedure required in the prior art.

Preferably, the jacket 60b is removed from a portion 60c of the optical fiber 60 which fits into an outer portion 54b of the extension 54. The inner diameter of the portion 54b is substantially equal to the diameter of the core 60a (the jacket 60b is absent in the portion 60c) to provide a snug fit; an epoxy adhesive or the like is injected between the outer end portion 60c of the fiber 60 and the inner walls of the portion 54b and cap 64 for positive retention of the fiber 60 in the extension 54.

The jacket 60b is preferably left on a portion 60d of the optical fiber 60 which fits into an inner portion 54c of the extension 54. The inner diameter of the portion 54c is larger than the outer diameter of the jacket 60b. The inner portion 54c of the extension 54 may be formed with radial holes 54d through the wall thereof, to enable the jacket 60b to be adhered to the extension 54. An adhesive 66 such as epoxy may be applied to adhere the portions of the jacket 60b exposed by the holes 54d to the walls of the holes and thereby to the extension 54. Where the jacket 60b is made of a metal material, and a hermetic seal is required, the adhesive 66 may be constituted by soldering, brazing, welding, etc.

The assembly 50 further includes support members 68 disposed in the enclosure 52 between the extension 54 and the light propagating portion 56a of the component 56. The height of the support members 68 is designed to be substantially equal to the height of the lower surface of the optical fiber 60, so that the fiber 60 rests on the support members 68 and is vertically supported thereby. The fiber 60 is adhered to the support members 68 by an adhesive 70. Where the jacket 60b is made of a metal material, the adhesive 70 may be constituted by soldering, brazing, welding, etc. In this case, the support members 68 are made of a metal material, or an insulative material such as ceramic coated with metal on the upper surface thereof. As illustrated, the support members 68 are part of a block 72 which integrally supports the component 56. However, the component 56 may be mounted directly on the base 52e of the enclosure 52, or on a block or substrate which is separate from the support members (now shown).

Further illustrated is an optional protective tubular sleeve or hood 74 which may be press-fitted onto the extension 54. The outer surface of the extension 54 may be knurled or otherwise patterned to aid in retention of the hood 74 on the extension 54.

The walls 52a, 52b, 52c, and 52d of the housing 52 are preferably constituted by an integral extrusion formed of Kovar, a trademarked alloy manufactured by the General Electric Company, including 53% iron, 29% nickel, and 18% cobalt. Kovar is currently the industry standard for fabrication of hybrid microcircuit package housings. The base 52e and top 52g may also be made of Kovar, with the pins 58 fabricated with fused glass-to-metal seals. In applications where a Peltier cooler (not shown) is incorporated into the package and considerable heat is generated, the base 52e may be made from a high thermal conductivity material such as molybdenum or copper-clad molybdenum. In the case of an all Kovar enclosure, the housing 52 may be made by brazing the extrusion which forms the walls to the base, or by a coining operation. To reduce the stress on the glass-to-metal seals on the plug-in version of the package as illustrated, the base 52e is made larger than the hermetic portion of the housing 52, and has holes for mounting. Where a high thermal conductivity base is selected, it is brazed to the Kovar extrusion which constitutes the walls. In an all Kovar package, the pins can originate in the housing walls or in the base. In the high thermal conductivity version, the leads must extend through the walls. The extension 54 is inserted into the opening 52f in the enclosure 52, and fixed thereto by brazing using CuSil (an alloy of copper and silver), welding, soldering, etc. to provide an integral rigid and hermetic structure.

After fabrication of the enclosure 52 and extension 54, the component 56 and support members 68 are fixedly mounted therein, such that the light propagating portion 56a of the component 56 is aligned with the axis of the extension 54. The jacket 60b is stripped from the end of the fiber 60 which is to be inserted into the extension 54, and the opposite end of the fiber 60 is cleaved to the proper length. The cap 64 is attached to the end 54a of the extension 54. The fiber 60 is then inserted into extension 54 such that the stripped end thereof extends through the hole 64a in the cap 64, and fixed in place by means of the epoxy adhesive 66. If desired, the core 60a of the fiber 60 may be further fixed to the outer portion 54b of the extension 54 and the cap 64 by an adhesive such as epoxy cement. The external end face of the optical fiber 60 is then ground and polished so as to be flush or coplanar with the outer surface of the end 64b of the cap 64. The fiber 60 is then adhered to the support members 68. Although the optical fiber 60 will be automatically self-aligned with the light propagating portion 56a of the component 56 with sufficient accuracy for most practical applications, in a case where extreme precision is required, an alignment procedure such as described with reference to the assembly 10 may be performed prior to adhesion of the fiber 60 to the support members 68. The enclosure 52 is then hermetically sealed, and the assembly 50 inspected and tested to ensure that all mechanical, electrical, and optical requirements are fulfilled. The fabrication is completed by pressing the hood 74 onto the extension 54.

While several illustrative embodiments of the invention have been shown and described, numerous variations and alternate embodiments will occur to those skilled in the art, without departing from the spirit and scope of the invention. Accordingly, it is intended that the present invention not be limited solely to the specifically described illustrative embodiments. Various modifications are contemplated and can be made without departing from the spirit and scope of the invention as defined by the appended claims.

We claim:

1. An optoelectronic assembly, comprising:
   an enclosure having a wall formed with an opening therethrough;
   a tubular extension fixed to and extending away from the wall coaxially with the opening;
   an optoelectronic component mounted in the enclosure, the component having a light propagating portion self-aligned with an axis of the extension through the opening;
   an optical fiber fittingly retained in the extension, the optical fiber extending from substantially between the light propagating portion of the component and terminating at substantially an outer end of the extension; and
   a cap fixed to the outer end of the extension, the cap being formed with a central opening through which the optical fiber coaxially extends.

2. An assembly as in claim 1, in which an end of the optical fiber is coplanar with an outer end of the cap.

3. An optoelectronic assembly, comprising:
   an enclosure having a wall formed with an opening therethrough;
   a tubular extension fixed to and extending away from the wall coaxially with the opening;
   an optoelectronic component mounted in the enclosure, the component having a light propagating portion self-aligned with an axis of the extension through the opening;
   an optical fiber fittingly retained in the extension, the optical fiber extending substantially between the light propagating portion of the component and an outer end of the extension;
   a support member disposed in the enclosure between the wall and the light propagating portion of the component; and
   fixing means for fixing the optical fiber to the support member.

4. An assembly as in claim 3, in which the fixing means comprises adhesive means.

5. An optoelectronic assembly comprising:
an enclosure having a wall formed with an opening therethrough;
a tubular extension fixed to and extending away from the wall coaxially with the opening;
an optoelectronic component mounted in the enclosure, the component having a light propagating portion self-aligned with an axis of the extension through the opening;
an optical fiber having a light transmitting core and a metal jacket covering at least a portion of the core fittingly retained in the extension, the optical fiber extending substantially between the light propagating portion of the component and an outer end of the extension;
a support member having a metal surface disposed in the enclosure between the wall and the light propagating portion of the component; and
fixing means for fixing the metal jacket to the metal surface of the support member.

6. An assembly as in claim 5, in which the fixing means comprises soldering.

7. An optoelectronic assembly, comprising:
an enclosure having a wall formed with an opening therethrough;
a tubular extension fixed to and extending away from the wall coaxially with the opening the extension having an inner portion and an outer portion;
an optoelectronic component mounted in the enclosure, the component having a light propagating portion self-aligned with an axis of the extension through the opening;
an optical fiber fittingly retained in the extension, the optical fiber extending substantially between the light propagating portion of the component and an outer end of the extension;
the optical fiber having a light transmitting core, and a jacket covering at least a portion of the core which is retained in the inner portion of the extension; the jacket being absent on a portion of the core retained in the outer portion of the extension;
the inner portion of the extension has an inner diameter substantially equal to an outer diameter of the jacket; and
the outer portion of the extension has an inner diameter substantially equal to an outer diameter of the core.

8. An assembly as in claim 7, in which the extension is rigid.

9. An optoelectronic assembly, comprising:
an enclosure having a wall formed with an opening therethrough;
a tubular extension fixed to and extending away from the wall coaxially with the opening;
an optoelectronic component mounted in the enclosure, the component having a light propagating portion self-aligned with an axis of the extension through the opening;
an optical fiber fittingly retained in the extension, the optical fiber extending substantially between the light propagating portion of the component and an outer end of the extension;
the optical fiber having a light transmitting core and a jacket covering at least a portion of the core which is retained in the extension;
the extension is formed with a radial hole through a wall thereof; and
the assembly further includes fixing means for fixing the jacket to a wall of the radial hole.

10. An assembly as in claim 9, in which the fixing means comprises adhesive means.

11. A housing for an optoelectronic assembly, comprising:
an enclosure for mounting an optoelectronic component having a light propagating portion therein, the enclosure having a wall formed with an opening therethrough; and
a rigid tubular extension fixed to and extending away from the wall coaxially with the opening, the extension having an axis arranged to be aligned with the light propagating portion of the component when the component is mounted in the enclosure;
the extension including an outer portion having an inner diameter substantially equal to an outer diameter of a light transmitting core of an optical fiber which is arranged to be fittingly inserted into the extension and extend from substantially the light propagating portion of the component and terminate at substantially an outer end of the extension, the optical fiber having a jacket formed on the core; and an inner portion having an inner diameter substantially equal to an outer diameter of the jacket.

12. A housing as in claim 11, further comprising a cap arranged to be fixed to an outer end of the extension, the cap being formed with a central opening for the optical fiber to extend therethrough.

13. A housing as in claim 11, further comprising:
a support member disposed in the enclosure between the wall and the light propagating portion of the component for fixedly supporting the optical fiber.

14. A housing for an optoelectronic assembly comprising:
an enclosure for mounting an optoelectronic component having a light propagating portion therein, the enclosure having a wall formed with an opening therethrough;
a rigid tubular extension fixed to and extending away from the wall coaxially with the opening, the extension having an axis arranged to be aligned with the light propagating portion of the component when the component is mounted in the enclosure; and
optical connector means provided at an outer end of the extension;
the extension being arranged to fittingly retain therein a portion of an optical fiber which extends from substantially the light propagating portion of the component and terminates at the optical connector means.

15. A housing as in claim 14, in which the optical connector means comprises a cap arranged to be fixed to an outer end of the extension, the cap being formed with a central opening for the optical fiber to extend therethrough.

16. A housing as in claim 14, further comprising:
a support member disposed in the enclosure between the wall and the light propagating portion of the component for fixedly supporting the optical fiber.

* * * * *